United States Patent [19]

Hofmann

[11] 4,200,934
[45] Apr. 29, 1980

[54] CIRCUIT ARRANGEMENT FOR CORRECTING DIGITAL SIGNALS

[75] Inventor: Otto Hofmann, Kirchstockach, Fed. Rep. of Germany

[73] Assignee: Messerschmitt-Bölkow-Blohm GmbH, Munich, Fed. Rep. of Germany

[21] Appl. No.: 891,291

[22] Filed: Mar. 29, 1978

[30] Foreign Application Priority Data

Apr. 2, 1977 [DE] Fed. Rep. of Germany ....... 2714777

[51] Int. Cl.² ........................... G01J 3/42; H04N 5/14
[52] U.S. Cl. .................................. 364/571; 250/209; 358/163; 364/525
[58] Field of Search ................ 364/525, 571; 250/209; 356/82, 96; 358/163, 164, 166, 168, 217

[56] References Cited

U.S. PATENT DOCUMENTS

| | | | |
|---|---|---|---|
| 3,653,014 | 3/1972 | List et al. | 250/209 |
| 3,852,714 | 12/1974 | Carson | 250/209 |
| 3,919,473 | 11/1975 | Cotter | 358/163 |
| 3,972,626 | 8/1976 | Laskowsi | 364/571 |
| 4,084,248 | 4/1978 | Scott | 364/525 |
| 4,086,652 | 4/1978 | Mantz | 364/525 |

FOREIGN PATENT DOCUMENTS 2055639  12/1971  Fed. Rep. of Germany ........... 358/163

Primary Examiner—Errol A. Krass
Attorney, Agent, or Firm—W. G. Fasse; D. F. Gould

[57] ABSTRACT

The analog output signals of a photoelectric image converter or transducer are passed through an analog-to-digital converter and then corrected to take various irregularities of the optical sensor elements of the transducer into account. A reference signal and a dark signal are subtracted from the individual image point signals. The difference is then multiplied by a factor representing the slope of the characteristic response curve of the respective optical sensor element. The so corrected signal may be used for further processing or it may be subjected to a further correction operation.

9 Claims, 3 Drawing Figures

CIRCUIT ARRANGEMENT FOR CORRECTING DIGITAL SIGNALS

BACKGROUND OF THE INVENTION

The invention relates to a circuit arrangement for correcting the signals of a photoelectric image converter, which signals have been converted into digital form. Said image converter comprises a plurality of converter elements arranged in a row or area, especially for an image converter for performing precise brightness measurements.

Image converters of the mentioned type are, for example, required for taking pictures from satellites or aerial pictures, for taking thermograms, X-ray films and the like. The accuracy of the subsequent evaluation depends in this type of devices to a large degree on the characteristics of the individual converter elements of the image converter which are sequentially scanned. According to the present state of the art it is possible to manufacture at reasonable expense only photoelectric converters arranged in lineal or planar manner and having tolerances of ±5–10%. Stated differently, the individual converter elements differ from each other with regard to their dark signals and such saturation signals as well as with regard to the steepness of their characteristic curve and also with regard to variations of their converter characteristics which depend on time and temperature. Further sources of error in a precise radiation measurement of the object occur due to the light decrease or drop-off in the recording optical means and, where the object is artificially illuminated, the irregularity in the illumination also constitutes a source of error. These error sources have quite similar effects as the differing characteristic curves of the individual elements of the image converter.

OBJECTS OF THE INVENTION

Thus, it is an object to make a correction of the digital image converter signal by means of correction factors in order to produce a photoelectric image converter system having a high radiometric resolution capability and which is intended for making precise brightness measurements. The correction factors are to eliminate errors in the sensors as well as errors in the transition path and in the reference illumination. Further, such a correction system is to work in the real time operation of the signal path so that a corrected signal is immediately available.

SUMMARY OF THE INVENTION

A calibration measurement is necessary for the determination of the correction factors. The calibration measurement may be repeated at random intervals. The foregoing objective is achieved for a photoelectric image converter as described above with the aid of a circuit arrangement in which computers and memories are connected to the digital signal output of the analog-to-digital converter, said computers and memories being controlled by electronic switching means associated with electronic control means of the image converter and by means of which a corrected output signal is formed for each signal of a converter element. The clock pulses and the line pulses for driving the electronic switching means may be derived from a known electronic control of the image converter. The electronic switching control means may further be provided with a key for starting a calibration measurement.

Very high requirements regarding the precision of the obtained image converter signals may be satisfied according to a further embodiment of the invention in that the computers and memories form corrected output signals in accordance with the equation $$UK_i = (U_i - U_B - D_i) \cdot K_i$$

wherein $U_i$ is an image point signal formed in a known manner. The image point signal is diminished by a reference signal ($U_B$) which is constant for at least one scanning period during the scanning of all converter elements and which is further diminished by a dark signal ($D_i$) corresponding to the respective, scanned converter element and which is multiplied with a factor $K_i$ proportional to the slope of the characteristic curve of a respective converter element.

The circuit arrangement may be realized with relatively low costs for the electronic means if the electronic means comprise, according to a further embodiment of the invention, an electronically controlled switch by means of which a signal is supplied into a memory at the beginning of each scanning. This signal is constant for the respective scanning period and determines the reference level, said signal being also supplied to a digital substraction member during a scanning period of the converter, and wherein further the signal sequence of the scanned converter elements is supplied from the signal conductor of the converter to said memory.

The differences in the "dark signals" of the individual converter elements are corrected by using the above described circuit arrangement, which, according to a further embodiment of the invention is provided with a further digital subtraction member having one input to which there are supplied the dark signals which are provided for each converter element by a further digital memory by way of a calibration measurement, said dark signals being deducted from the measured signals which are supplied to the other input of said subtraction member, and which measured signals have been corrected by the reference signal to produce a partially corrected measured signal.

According to an analog, further embodiment of the circuit arrangement, the different brightness signals of the individual converter elements are obtained through a calibration measurement. These signals are supplied into a memory which ascertains with the aid of a computer, the slope of the characteristic curve of the converter elements, said computer having supplied thereto a constant value "C" and the brightness signals retrieved from the memory. The storing of the brightness signals is only necessary until the quotient formed from the constant value and a brightness signal is available. Thus, in a suitable further embodiment of the invention, the storage positions, in the memory which are occupied by the brightness signals are sequentially erased and signals representing the correction factors are stored therein, said correction factor signals being proportional to the slope of the individual converter elements. Corrected signals of the first order are then formed by means of a further computer to which there are supplied the partially corrected signals and the signals representing the slope of the characteristic curves, whereby said further computer multiplies the just mentioned signals. If necessary, it is possible to satisfy higher requirements by means of a further computer which performs a further correction of the second order. In the alternative, where the precision requirements are lower, portions of the circuit arrangement may be omitted.

BRIEF FIGURE DESCRIPTION

Further details of the invention are described hereafter with reference to the drawings, wherein.

DETAILED DESCRIPTION OF PREFERRED EXAMPLE EMBODIMENTS

Figure 1:
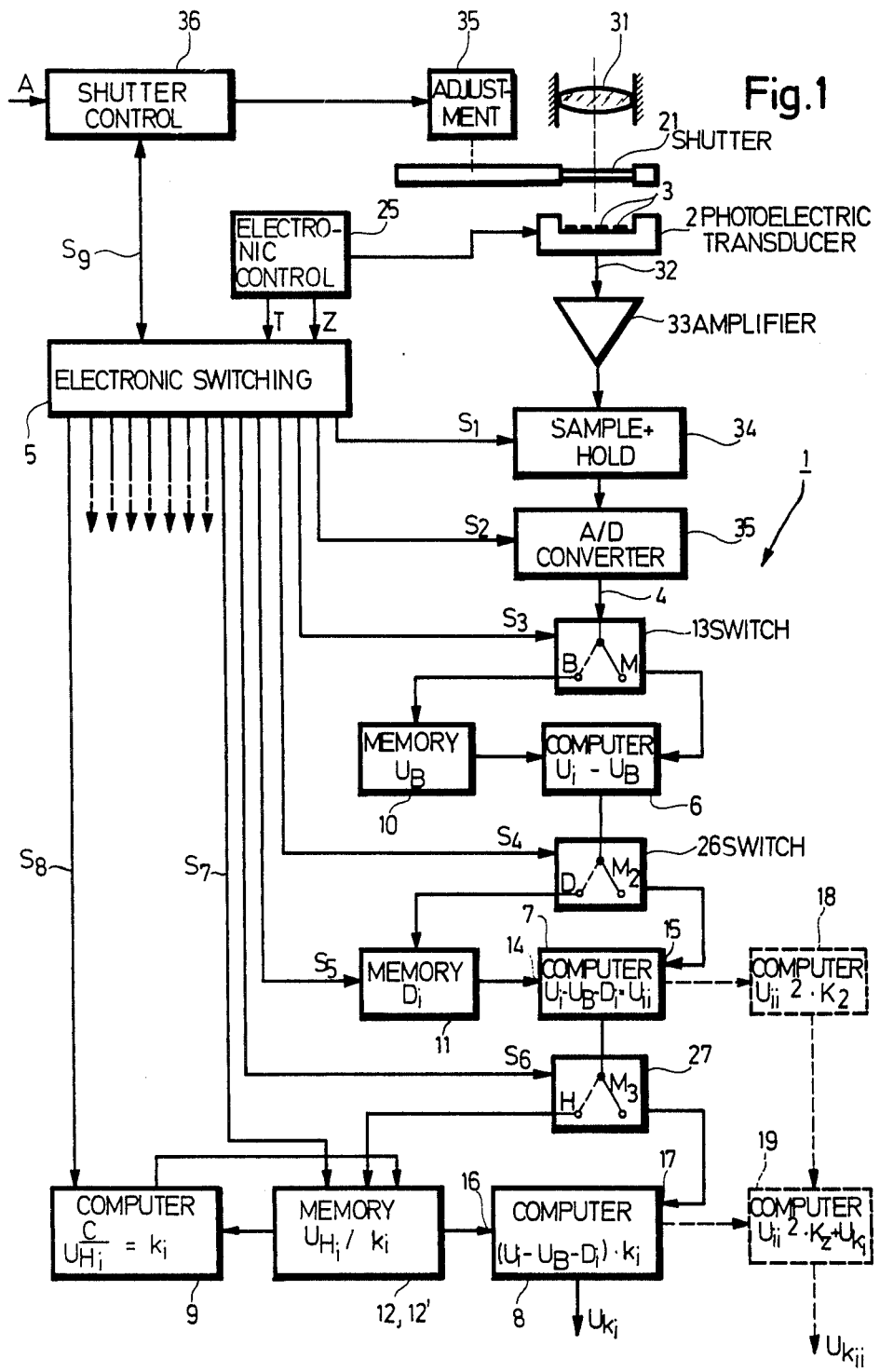
FIG. 1 shows the block circuit diagram of an embodiment of the circuit arrangement according to the invention.

The block circuit diagram of FIG. 1 shows a circuit arrangement wherein the image produced by optical means 31 is converted into electrical signals by means of a photoelectric transducer 2 comprising a plurality of transducer elements 3. For this purpose, electronic control means 25 are associated with the photoelectric converter or transducer 2. The electronic control means 25 may form an integral part of the transducer 2.

Figure 2:
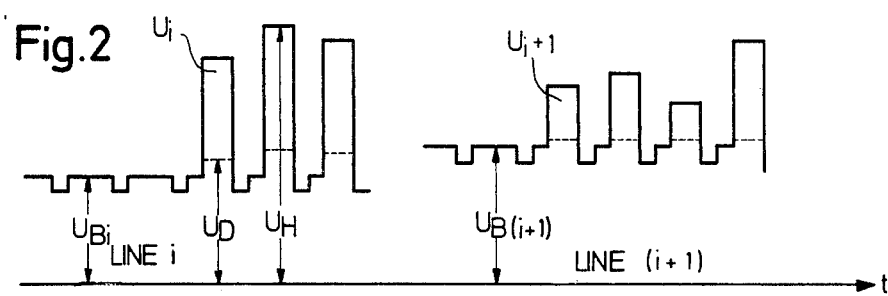
FIG. 2 shows a diagram of the signals of an image converter produced in digital form and containing errors.

Such transducers are commercially available for many types of applications. Such transducers are equipped for example, with 1000 to 2000 transducer elements 3 arranged in rows. In connection with applications of the type described in the introduction, the image transducer 2 produces analog signals 32 which are normally processed through an amplifier 33. For the further processing the signals are suitably supplied through a sample and hold circuit 34 to an analog-to-digital converter 35 which transforms the analog signals into digital signals. FIG. 2 illustrates the signals at the output 4 of the analog-to-digital converter.

Reference signals $U_{Bi}$ appear at the output 4 of the digital converter 35 prior to a signal sequence which is to be evaluated. These reference signals $U_{Bi}$ may comprise a constant value or a value which is only constant for the scanning period of one line. This reference signal may be reduced to zero already when the analog signals are produced. This may be done by known electronic means, for example, a diode clamping circuit so that $U_i$ already represents the measured signal referenced to a reference line. Three signals $U_i$ which are obtained from sequentially arranged transducer elements 3 of a line exposed to the respectively same illumination, are shown in the left diagram. It is noticeable that these signals differ from each other due to the characteristics of the individual transducer elements. These signals differ from each other when the transducer is darkened (dark signals $U_D$) and when the transducer is exposed to light (bright signals $U_H$). Stated differently, the slope of the characteristic curve of the individual transducer elements is also different for each element. The signals $U_{i+1}$ shown in the right portion of the diagram are obtained by means of the same arrangement but from another line (i+1). Another reference signal $U_{B+1}$ precedes the signals $U_{i+1}$ relative to the signal $U_i$. Thus, a direct comparing of both signals sequences would result in an erroneous measurement. Where the transmission is by means of a capacitive or a.c. coupling, the position of the reference signal depends on the image signal amplitudes of an entire line.

The circuit arrangement of FIG. 1 serves for eliminating these deficiencies. In the circuit of FIG. 1 an image or an image line is imaged onto a photoelectric transducer 2 with the aid of optical means 31. In the following specification one must distinguish between the real time measuring operation during which the image signals are corrected and the calibration operation which takes place at the beginning of the measuring. The correction values are ascertained during the calibration process. The analog signals 32 scanned from the individual transducer elements 3, which are addressed by a known electronic control means 25, are supplied through an amplifier 33 and through a sample and hold circuit 34 to an analog-to-digital converter 35 having a digital signal output 4 connected to an electronically controlled switch 13 having change-over contacts B and M. A reference signal $U_B$ is supplied to the memory 10 at the beginning of each line. The reference signal $U_B$ is representative as a reference for the duration of a line or image scanning. For this purpose the switch 13 is brought automatically and electronically into the switch position B at the beginning of each line by means of the electronic switching control 5 and by means of the electronic control circuit 25 associated with the electronic switching control 5. The electronic control circuit 25 and the electronic switching control 5 then make sure that the switch 13 is brought into the position M prior to the arrival of the first measured signals from the first transducer elements 3. A computer 6 is connected with one input to the contact M of the switch 13 and the computer 6 forms the difference between the measured signals $U_i$ and the reference signals $U_B$. The signal $U_B$ is supplied from the memory 10 during one measuring period and the image signals $U_i$ are sequentially supplied by the transducer elements 3. The partially corrected signals $U_i - U_B$ are retrieved from the computer 6 and supplied to a further electronically controlled switch 26 having the selector switch contacts D and $M_2$.

Subsequently, in the switch position $M_2$ the partially corrected signals $U_i - U_B$ are supplied to an input 15 of a further computer 7 through the switch 26. The computer 7 then forms further partially corrected signals $U_i - U_B - D_i = U_{ii}$ during a measuring period thereby using the dark signals $D_i$ supplied by means of the memory 11 to the further input 14 of the computer 7. The signals $U_{ii}$ are supplied to a third electronic switch 27 constructed as an analog switch and driven as an analog switch. When the switch 27 is in the switching position $M_3$, the further partially corrected signals $U_{ii}$ are supplied to a further computer 8 from the computer 7. Simultaneously the computer 8 receives the respective $K_i$-values from the memory 12'. The computer 8 provides at its output the signals $U_{Ki} = (U_i - U_B - D_i) \cdot K_i$ by multiplying the signal $U_{ii}$ with the factors $K_i$ whereby first degree (linear) corrected signals are obtained.

The dark signals $D_i$ and the correction factors $K_i$ are ascertained prior to the beginning of the measuring and if necessary, also at certain time intervals during the measuring by way of a special calibration measuring. The switch 26 is driven analogously to the switch 13 by means of the control and switching electronic means 25 and 5. The switch 26 assures that in the position D the dark signals $D_i$ of all individual transducer elements 3 of the transducer 2, are stored in a memory 11 by wall of a calibration measurement. During this measurement a shutter 21 arranged between the optical means 31 and the image transducer 2 is closed. The closing of the shutter may be accomplished by means of an adjustment or drive member 35 and a shutter control 36, whereby the latter may be operated by hand as indicated by the arrow A or by means of a signal derived from the electronic switching control means 5.

Figure 3:
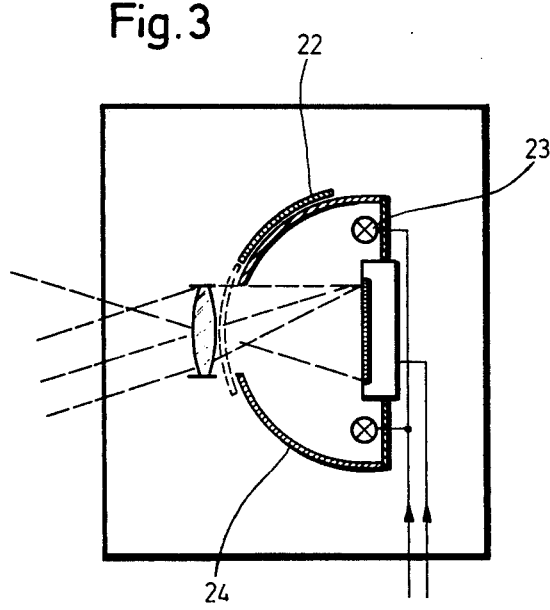
FIG. 3 shows an image converter device deviating from that of FIG. 1 and combined with a so-called Ulbricht-globe.

Subsequent to the dark calibration, the individual transducer elements 3 are calibrated with regard to their "bright signals". For this purpose the shutter 21 is controlled to be in its open position in the arrangement of FIG. 1, whereby the transducer element 3 is exposed to a reference light distribution. In the alternative, shown in FIG. 3, wherein the transducer arrangement forms part of an Ulbricht-globe 22, the shutter 21 is closed and the calibration light source 23 is switched on. A third electronic switch 27 is first brought into its position H. The switch 27 is constructed and driven in a manner analogous to the above example embodiments and has selector switch contacts H and $M_3$. At this time the switch 26 is in the position $M_2$. Thus, the brightness signals $U_{Hi}$ which are corrected relative to their reference signal $U_B$ and relative to their dark signal $D_i$ are applied to the switch 27 from the computer 7. The brightness signals $U_{Hi}$ are then stored in the memory 12. The computer 9 forms the quotients of a constant value C and the signals $U_{Hi}$ sequentially retrieved from the memory 12. During this time, storage positions which become available, are filled again by the calculated quotients $K_i$ which constitute a measure for the slope of the characteristic curve of the individual transducer elements 3.

Where the highest requirements regarding the measuring precision must be met for taking into account curved characteristic curves of the transducer elements 3, a correction of the second degree (square) or higher degree may, for example, become possible in that additional computers 18 and 19 are associated with the computers 7 and 8, whereby the computer 18 forms the product of $(U_{ii})^2$ and a constant correction value $K_2$. The computer 19 adds to the just mentioned product, the signal $U_{Ki}$ which has been corrected in a first degree, linear manner.

The electronic switching control 5 of FIG. 1 serves for addressing or driving the sample and hold circuit 34 of the analog-to-digital converter 35, the switches 13 and 26, the memory 11 and the switch 27 as well as the memories 12, 12'. It also serves for driving the computer 11 and the shutter control 36. For this purpose the switching control circuit 5 comprises signal outputs $S_1$ to $S_9$ whereby further signal outputs for additional devices, for example, signal lamps or the like are shown unconnected to simplify the illustration. The construction of the electronic switching control circuit may be accomplished in any desirable, suitable manner, for example, by means of a micro-processor and it is not part of the invention.

The block symbols illustrated in FIG. 1 relate without exception to generally known modular units which may, for example, be realized by the following integrated circuits.

| Circuit Block Signal | Designation | Firm or Manufacturer | Type |
| --- | --- | --- | --- |
| Shutter control 36 | Micro-Computer | Zilog, USA or Intel, USA | 780 8080 |
| Electronic switching control 5 | | | |
| Computer 9 | | | |
| Adjustment or drive member 35 | Servomotor | ESCAP Switzerland | 16M11-210 |
| Electronic Control Circuit 25 | Ev. Circuit | Reticon USA or Fairchile USA | RC701 SL 61266 |
| Photosensor 2 | linear photo-sensor | Fairchild USA or Reticon | CCD 121 CCPD 1728 |
| Amplifier 33 | operational amplifier | National Semi-Conductor Teledyne Philbrick USA | LH 0032 and similar 4853 |
| Sample and Hold Circuit 34 | Sample and Hold | | |
| Analog-to-digital converter 35 | Analog-to-digital Converter | TRW/USA | TDC 10023 |
| Electronically controlled switches 13, 26, and 27 | Bus-driver (bi-directional) | Intel USA | 8216 |
| Memories 10, 11, 12 and 12' | RAM | Intel USA | 2114 |
| Computers 6, 15, and 19 | 2 × 4 Bit Full Adder | Texas Instruments USA | SN 7425283 |
| Computers 8, 18, and 19 | Digital Multiplier | MMI USA | 67558D |

Although the invention has been described with reference to specific example embodiments, it will be appreciated, that it is intended, to cover all modifications and equivalents within the scope of the appended claims.

I claim:

1. An electronic circuit arrangement for correcting the output signals of a photoelectric image transducer which includes a plurality of photoelectric transducer elements, said circuit arrangement comprising analog-to-digital converter means having an input operatively connected to said image transducer and a digital signal output, a plurality of selector switch means (13, 26, 27) including first, second, and third selector switch members each having an input terminal and two alternate output terminals, a like plurality of computer means (6, 7, 8) including first, second, and third circuits each having two inputs and an output, first, second and third memory circuit means (10, 11, 12) each having at least one input and an output, and electronic switching control means (5, 25) operatively connected to said circuit arrangement, said first selector switch member (13) being connected with its input terminal to said digital signal output (4) of said analog-to-digital converter means and with one of its outputs to one input of said first computing circuit (6), said first memory circuit means (10) being connected to the other output terminal of said first selector switch means and to the other input terminal of said first computing circuit which forms a first difference signal $U_i - U_B$, said second selector switch member (26) being connected with its input terminal to the output of said first computing circuit to receive said first difference signal with one of its output terminals to the second computing circuit (7) said second memory circuit means (11) being connected to the other output terminal of said second selector switch means and to the other input terminal of said second computing circuit which forms a second difference signal $(U_i - U_B) - D_i$, said third selector switch member (27) being connected with its input to the output of said second computing circuit (7) with one of its output terminals to said third memory circuit means and with its other output terminal to said third computing circuit (17), said third memory circuit means (12) being connected with an output terminal (16) to said third computing circuit (17) which multiplies the second difference signal $(U_i - U_B) - D_i$ with a correction factor $K_i$ which is proportional to the slope of the characteristic curve of a respective photoelectric transducer element (3) to form real time corrected output signals $U_{Ki}$ for each image point signal $U_i$ of a photoelectric transducer element, wherein $U_B$ is a reference signal representative of a respective scanning period and wherein $D_i$ is a dark signal of the respective scanned photoelectric transducer element.

2. The electronic circuit arrangement of claim 1, wherein said first selector switch member (13) supplies said reference signal $U_B$ at the beginning of the respective scanning period through said first memory circuit means to form said first difference signal $U_i - U_B$ in said first computing circuit, and wherein said reference signal $U_B$ is further supplied by said first memory circuit means to said first computing circuit during the respective scanning period when the first computing circuit receives the scanned signals $U_i$.

3. The electronic circuit arrangement of claim 1, further comprising shutter means and light supply means arranged for exposing said transducer elements to light, and wherein said second memory circuit means (11) has stored therein said dark signal $D_i$ which is derived from each of said transducer elements (3) when said shutter means are closed.

4. The electronic circuit arrangement of claim 3, comprising a fourth computer circuit (9) operatively connected to said electronic switching control means (5) and to said third memory circuit means (12) for forming said correction factor $K_i$ by dividing a constant value C by partially corrected brightness signals $U_{Hi}$ derived from said transducer elements (3) when the shutter means pass a reference light distribution from said light supply means onto said transducer elements.

5. The electronic circuit arrangement of claim 4, wherein said third memory circuit means has storage capacity of said correction factor $K_i$ and a storage capacity for said partially corrected brightness signals $U_{Hi}$, said storage capacities having storing positions arranged so that storing positions becoming available by being addressed for the retrieval of the partially corrected brightness signals $U_{Hi}$ are occupied by the correction factors $K_i$.

6. The electronic circuit arrangement of claim 1, comprising further computer means (18, 19) operatively connected to said second and third computing circuits, said further computer means performing a second degree or square correction of said real time corrected output signals $U_{Ki}$.

7. The electronic circuit arrangement of claim 1, further comprising shutter means for exposing said transducer elements, and wherein said electronic switching control means are operatively connected to said shutter means.

8. The electronic circuit arrangement of claim 1, further comprising shutter means and a calibration light source means operatively arranged to pass light through said shutter means onto said photoelectric transducer means.

9. The electronic circuit arrangement of claim 8, wherein said calibration light source means comprise an Ulbricht-globe, and wherein said shutter means are secured to said Ulbricht-globe.

* * * * *